United States Patent
Inoue et al.

[11] Patent Number: 6,109,903
[45] Date of Patent: Aug. 29, 2000

[54] APPARATUS FOR MANUFACTURING A RUBBER-METAL PLATE COMPOSITE

[75] Inventors: Yoichi Inoue; Shigeru Yuki, both of Takasago; Hirohiko Fukumoto, Kobe; Shigeto Adachi, Takasago; Kashiro Ureshino, Takasago; Takayuki Sato, Takasago; Yoshinori Kurokawa, Takasago; Kazuhiko Sakiyama, Takasago, all of Japan

[73] Assignee: Kabushiki Kaisha Kobe Seiko Sho, Kobe, Japan

[21] Appl. No.: 08/941,033

[22] Filed: Sep. 30, 1997

[30] Foreign Application Priority Data

Sep. 30, 1996 [JP] Japan .................................. 8-280137
Nov. 11, 1996 [JP] Japan .................................. 8-315399
Nov. 14, 1996 [JP] Japan .................................. 8-321022

[51] Int. Cl.⁷ ........................................ B29C 33/02
[52] U.S. Cl. .................... 425/174.8 R; 156/379.7; 219/601; 219/633; 264/487; 264/496
[58] Field of Search ............... 425/174.8 R, 174.8 E; 264/486, 487, 496; 156/379.7; 219/633, 601, 603

[56] References Cited

U.S. PATENT DOCUMENTS 3,373,966  3/1968  Rowe et al. ................ 425/174.8 R
4,446,562  5/1984  Friedmann et al. ............. 373/149
5,338,497  8/1994  Murray et al. ................ 264/486
5,438,181  8/1995  Volkmann et al. ............. 219/601
5,483,043  1/1996  Sturman, Jr. et al. .......... 264/486

FOREIGN PATENT DOCUMENTS 3144781    5/1983  Germany ................... 264/487
49-32778   9/1974  Japan ................... 425/174.8 R
57-137133  8/1982  Japan ....................... 264/486
59-19018   1/1984  Japan .

*Primary Examiner*—Robert Davis
*Attorney, Agent, or Firm*—Oblon, Spivak, McClelland, Maier & Neustadt, P.C.

[57] ABSTRACT

A vulcanized rubber-metal plate composite is obtained by overlaying a plurality of unvulcanized rubber layers and metal plates alternately and heating thereof by magnetic induction heating. The vulcanized rubber-metal plate composite is obtained by placing a composite of a plurality of unvulcanized rubber layers and metal plates, each being overlaid alternately, into a place affected by an induction coil; heating the metal plates due to eddy currents formed in the metal plates by applying an alternating current to the induction coil; and vulcanizing the unvulcanized rubber layers due to heat conduction from the heated metal plates.

4 Claims, 15 Drawing Sheets

APPARATUS FOR MANUFACTURING A RUBBER-METAL PLATE COMPOSITE

BACKGROUND OF THE INVENTION

1. Field of the Invention

The present invention relates to a vulcanized rubber-metal plate composite which comprises a plurality of rubber layers and metal plates overlaid alternately, a method and an apparatus for heating an unvulcanized rubber-metal plate composite which is the original state of the vulcanized rubber-metal plate composite, and a method and apparatus for manufacturing the vulcanized rubber-metal plate composite.

2. Description of the Related Art

Vulcanized rubber-metal plate composites have been used in, for example, anti-seismic dampers or rubber bearings. The anti-seismic dampers are placed on the foundations of structures, e.g. buildings, bridges and machines to reduce response acceleration to excitation force due to earthquakes and thus to reduce damage to the structures. A typical anti-seismic damper for buildings has a large size, i.e., a design load over 500 tons and a diameter of approximately 1 meter.

Such a rubber-metal plate composite is manufactured by bonding a plurality of vulcanized rubber layers and metal plates alternately or by heating an unvulcanized rubber-metal plate composite to a vulcanization temperature while compressing it. A method for bonding the vulcanized rubber layers and the metal plates is disclosed in Japanese Patent Publication No. 59-19018, in which bonding layers are primarily heated by induction heating of the metal plates. Since this method requires a step for vulcanizing unvulcanized rubber layers one by one and a step for applying a bonding agent on the metal plates and overlaying the vulcanized sheets and the metal plates alternately, it is not desirable for large size composites such as anti-seismic dampers.

It is therefore preferred that a composite comprising unvulcanized rubber layers and metal plates is heated while being compressed to vulcanize the rubber layers. General methods for heating unvulcanized rubber include hot-plate pressing and hot pressing. Also, heating unvulcanized rubber due to heat transfer from a mold heated by electromagnetic induction is proposed in Japanese Patent Laid-Open No. 57-193340.

Since unvulcanized rubber is a heat-insulating material, the heating of rubber articles by means of an external heat source, e.g. a hot plate or a mold, needs a long time before the interior of the rubber is sufficiently heated, resulting in decreased productivity. Such a trend is noticeable in large size anti-seismic dampers. For example, a large anti-seismic damper for buildings having a design load of approximately 500 tons and a diameter of approximately 1 meter requires a vulcanization time of 10 to 20 hours. Heating while compressing such a large composite for a long time also consumes much energy resulting in increased production costs.

SUMMARY OF THE INVENTION

It is an object of the present invention to provide a method for rapidly heating an unvulcanized rubber-metal plate composite.

It is another object of the present invention to provide a method for heating an unvulcanized rubber-metal plate composite so as not to cause temperature differences in the composite during heating.

In accordance with the present invention, a vulcanized rubber-metal plate composite is obtained by overlaying a plurality of unvulcanized rubber layers and metal plates alternately and heating thereof by magnetic induction heating.

Since the metal plate which is a conductive material can be heated by eddy currents, magnetic induction heating can be used in the heating process of the composite.

Examples of metal plates include steel plates, stainless steel plates, aluminum plates, aluminum alloy plates, copper plates and copper alloy plates. A composite using metal plates other than steel plates barely causes a decrease in design load due to corrosion compared with a composite using steel plates.

A second aspect of the present invention is a method for heating an unvulcanized rubber-metal plate composite comprising the steps of: placing the composite comprising a plurality of unvulcanized rubber layers and metal plates, each being overlaid alternately, into a place affected by an induction coil; heating the metal plates due to eddy currents formed in the metal plates by applying an alternating current to the induction coil; and vulcanizing the unvulcanized rubber layers due to heat conduction from the heated metal plates.

In the metal plate which is a conductive material, eddy currents are generated due to change in magnetic flux. The magnetic flux density formed by the induction coil increases with the magnetic characteristics of the metal plate. The magnetic material enhances the magnetic field and the eddy currents and thus generate a large amount of heat. Other heat sources may be used to supply heat. Preferably, the metal plate is a steel sheet in view of strength and material costs.

Both the top and bottom layers of the composite are metal plates. These metal plates have a larger diameter than that of other metal plates in the composite, because the protruded section of each end metal layer is used as a flange and provided with holes for fixing the composite product to the foundations. In general, the composite is a solid cylindrical column or a cylindrical column having a central cavity. The composite may also be a polygonal column, such as a triangular prism with or without an inner cavity.

Preferably, the induction coil is arranged so as to generate eddy currents in the metal plates sandwiched between the vulcanized rubber layers along the direction perpendicular to the longitudinal direction of the composite in view of heating efficiency.

A preferable method for generating eddy currents in the metal plates along the direction perpendicular to the longitudinal direction of the composite or along the transverse direction of the composite is to place the composite inside the induction coil. Arrangement of a plurality of induction coils on the periphery of the composite may also be used. The heat applied to the periphery of the plate rapidly transfers to the entire metal plate having high thermal conductivity, and the unvulcanized rubber layers are heated by the metal plate heated on the whole. Herein the word "periphery" represents the outer periphery of a solid column or the outer and inner peripheries of a column having a central cavity. One of or both of the outer and inner peripheries may be heated. The inner periphery can be heated by an induction coil inserted into the central cavity.

In the second aspect, the alternating current applied to the induction coil may have a frequency in a range from 1 Hz to 1 kHz.

Heating efficiency decreases as the frequency decreases. An optimum frequency is determined so that uniform heating and heating efficiency are compatible. A frequency of less than 1 Hz needs a long time before the composite reaches a given temperature.

On the other hand, a frequency of not greater than 1 kHz does not cause temperature differences between the center and the top or bottom end of the composite. The higher the frequency, the more the top and bottom ends of the composite are intensively heated. Application of an alternating current with a low frequency can generate a uniform magnetic field over all the metal plates of the composite and thus uniformly heat these metal plates in a short time.

In the second aspect, the frequency of the alternating current applied to the induction coil may be varied during heating.

Varying the frequency controls heat generation at the periphery and the inside of each metal plate and thus reduces the temperature differences between them.

In the second aspect, the method may be applied to a preliminary step for heating the unvulcanized rubber in the composite to a predetermined temperature.

The vulcanization of the unvulcanized rubber requires a preliminary heating step and a vulcanizing step of the preheated rubber at a given temperature while compressing the preheated rubber. After the preheating step is performed by induction heating, the rubber may be vulcanized by a conventional method, such as hot-plate pressing or hot pressing, in the vulcanizing step.

In the second aspect, the method may be applied to a vulcanizing step for heating the composite while pressing the composite in the longitudinal direction.

After the preheating step is performed by a conventional process, e.g. hot-plate pressing or hot pressing, the rubber may be vulcanized by magnetic induction heating in the vulcanizing step. The magnetic induction heating can be used in both steps.

In the second aspect, the periphery of the composite may be confined to a mold during heating.

The unvulcanized rubber-metal plate composite is loaded into a compression mold in the vulcanization step. Since the composite is heated in the same mold through the preheating step and the vulcanization step in-situ, loading into and unloading from the mold are not required between these steps.

In the second aspect, the mold may comprise a nonmagnetic material or a weakly magnetic material.

Since the nonmagnetic or weakly magnetic mold attracts the magnetic flux, a satisfactory magnetic field is formed in the hollow cylindrical mold. The magnetic flux formed by the induction coil therefore passes through the metal plates of the composite contained in the hollow mold without being reduced by the mold, resulting in effective magnetic induction heating.

Although it is preferable that the mold comprise a nonmagnetic material, a weakly magnetic material also has a similar effect. Examples of weakly magnetic materials include austenitic stainless steels such as SUS304, concrete and ceramics.

In the second aspect, the mold may be provided with a heating means so that the composite is heated through the periphery due to heat conduction from the mold.

Conventional means of heating, for example, supplying a heating medium in the cavity formed in the mold, or providing a heating wire in the mold can be used in the present invention.

Such a means of heating can offset the temperature differences between the core and the periphery of the composite, i.e., temperature gradient in the transverse direction.

In the second aspect, the method may be performed while heating the composite with a means of heating that heats the composite through the top and bottom ends of the composite and that maintains the temperature of the composite.

A conventional means of heating, e.g. a hot plate with a circulating heating medium or with a heating wire, can be used as the means of heating. The means of heating can offset the longitudinal temperature gradient.

A third aspect of the present invention is a method for manufacturing a vulcanized rubber-metal plate composite described above, wherein the composite comprising a plurality of unvulcanized rubber layers and metal plates, each being overlaid alternately, is arranged in a place affected by an induction coil, an alternating current is applied to the induction coil to generate eddy currents in each of the metal plates and to heat the metal plates, and the unvulcanized rubber layers are vulcanized by being heated by means of heat conduction from the heated metal plates while compressing the composite in the longitudinal direction.

In this aspect, induction heating is applied at both the preliminary heating step and the vulcanizing step in the production of a vulcanized rubber-metal plate composite. Both the steps can be performed in the same apparatus with high efficiency.

In the third aspect, the composite may be heated in a mold bounding the periphery of the composite.

Since the composite can be heated in the mold in situ, loading into and unloading from the mold are not required and thus the production processes can be simplified.

A fourth aspect of the present invention is a method for manufacturing a vulcanized rubber-metal plate composite described above, wherein the composite comprising a plurality of unvulcanized rubber layers and metal plates, each being overlaid alternately, is arranged in a place affected by an induction coil, an alternating current is applied to the induction coil to generate eddy currents in each of the metal plates and to preheat the metal plates, and the unvulcanized rubber layers are vulcanized by heating while compressing the composite in the longitudinal direction.

The vulcanization of the unvulcanized rubber requires a preliminary heating step and a vulcanizing step of the preheated rubber at a given temperature while compressing the preheated rubber. After the preheating step is performed by induction heating, the rubber may be vulcanized by a conventional method, such as hot-plate pressing or hot pressing, in the vulcanizing step.

In the fourth aspect, the composite may be heated in a mold bounding the periphery of the composite.

Since the composite can be heated in the mold in situ, loading into and unloading from the mold are not required and thus the production processes can be simplified.

A fifth aspect of the present invention is a method for manufacturing a vulcanized rubber-metal plate composite comprising the steps of: exposing at least a part of the metal plate among all the metal plates as constituents of the rubber-metal composite from the unvulcanized rubber layers and heating thereof by induction heating to vulcanize the rubber, and forcibly cooling the exposed section of the metal plate.

Force-cooling of the exposed section of the metal plate permits rapid cooling from the inside of the composite due to heat dissipation through the metal plate, resulting in a shortened cooling period of the composite after vulcanization.

Preferably, the exposed section of the metal plate is forcibly cooled with a liquid or gaseous cooling medium. Such a cooling medium is easy to handle and prompts the cooling.

In the fifth aspect, the exposed section of the metal plate may be forcibly cooled through a cooling fin attached to the protruded section.

The exposed section can be more rapidly cooled through the cooling fin which is cooled with a cooling medium.

A sixth aspect of the present invention is an apparatus for heating a rubber-metal plate composite comprising a plurality of unvulcanized rubber layers and metal plates, each being overlaid alternately, by induction heating, the apparatus comprising:

an induction coil for applying a magnetic field to the composite and heating the metal plates due to eddy currents generated by the magnetic field; and a power unit for applying an alternating current to the induction coil to generate the magnetic field.

Since the metal plates themselves in the composite are heated by this heating apparatus, the interior of the composite is directly heated through the metal plates. The entire composite can be more rapidly heated to a predetermined temperature compared with external heating apparatuses.

In the sixth aspect, the apparatus may further comprise a mold to confine the periphery of the composite.

The transition from the preheating step to the vulcanizing step can be performed smoothly and thus the vulcanizing system can be simplified.

In the sixth aspect, the apparatus may further comprise a heating unit for heating the mold.

When the mold is made of nonmagnetic or weakly magnetic stainless steel, the mold itself functions as the heating unit by eddy currents generated in the conductive mold whereas the magnetic flux permeates the mold without loss and reaches the composite.

When the stainless steel is not used, the composite can be heated from its periphery through the mold which is heated by the heating unit. The temperature differences between the core and the periphery of the composite can therefore be offset, resulting in rapid and uniform heating of the composite.

A conventional heating unit, e.g. a hot plate with a circulating heating medium or with a heating wire, can be used as the heating unit.

The composite may be heated by a heating member which comes into contact with the periphery of the composite and includes a heating unit, instead of the mold.

In the sixth aspect, the apparatus may further comprise hot plates for heating both the top and bottom ends of the composite.

These hot plates can also be heated by a conventional process, e.g. a heating medium process or an electrical heating process, as in the mold heating process.

The hot plates can offset longitudinal temperature differences and thus permit rapid and uniform heating of the composite. When the composite is heated by a compression press, the upper and lower platens may be used as the hot plates.

In the sixth aspect, the power unit may further comprise a frequency meter for changing and controlling the frequency of the alternating current.

An optimum frequency of the magnetic field can be applied to the composite in response to the size of the composite. Also, the frequency meter can vary the heat generated in the preliminary heating step and the vulcanizing step. Accordingly, the frequency meter can adjust the quantity of heating in view of the purpose and permits rapid and uniform heating of the composite.

A seventh aspect of the present invention is an apparatus for manufacturing a vulcanized rubber-metal plate composite comprising an apparatus for heating as described above and a compressing means for compressing the composite in the longitudinal direction.

The entire composite can be heated and vulcanized in a short time with a simplified apparatus.

DETAILED DESCRIPTION OF THE PREFERRED EMBODIMENTS

Figure 1:
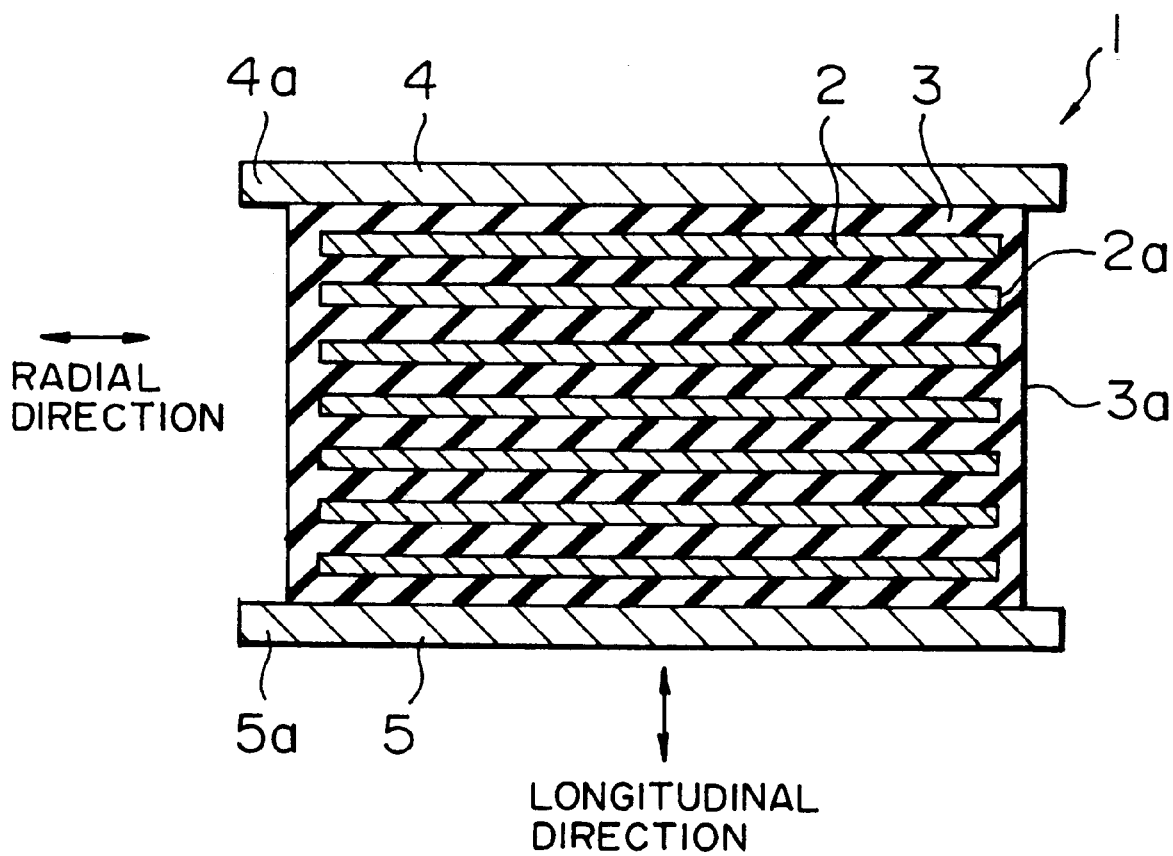
FIG. 1 is a longitudinal cross-sectional view of an embodiment of a rubber-metal plate composite in accordance with the present invention.
Figure 2:
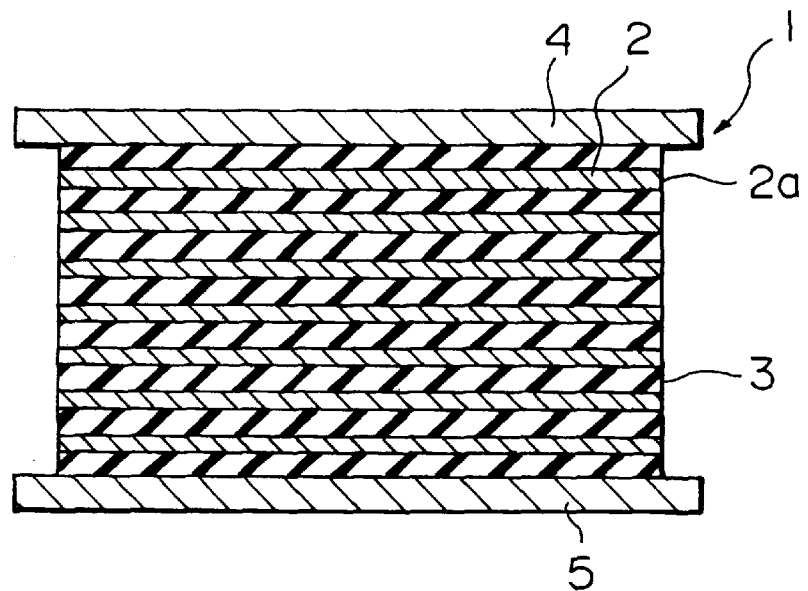
FIG. 2 is a longitudinal cross-sectional view of another embodiment of a rubber-metal plate composite in accordance with the present invention.
Figure 3:
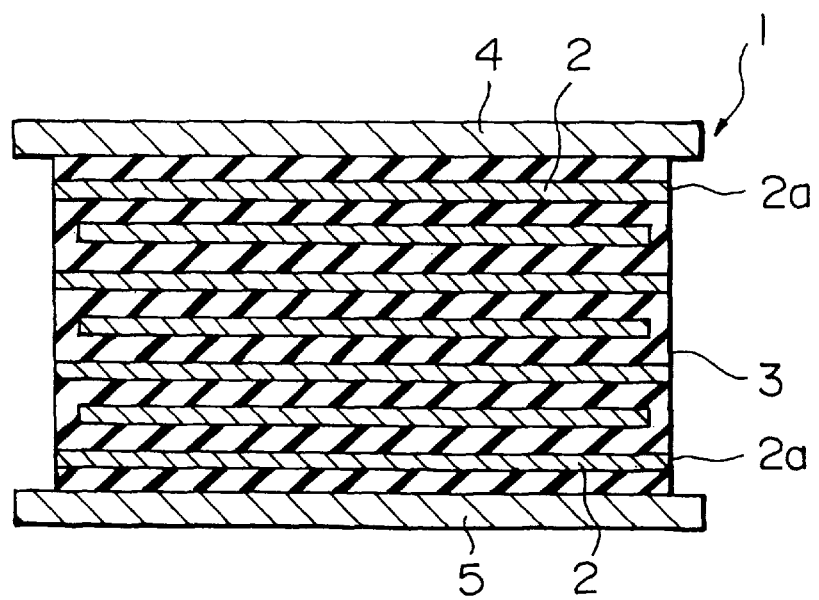
FIG. 3 is a longitudinal cross-sectional view of a further embodiment of a rubber-metal plate composite in accordance with the present invention.

Embodiments of the present invention will now be described with reference to the drawings. FIGS. 1 to 3 are longitudinal cross-sectional views of embodiments of a composite in accordance with the present invention. In general, the composite is a solid cylindrical column or a cylindrical column having a central cavity. The composite may also be a polygonal column, such as a triangular prism with or without an inner cavity.

In FIG. 1, the composite 1 comprises a plurality of metal plates 2, 4 and 5 and rubber layers 3, which are overlaid alternately, and these metal plates are arranged parallel to each other. The metal plates 2 are also referred to as inner plates 2, and the metal plates 4 and 5 are also referred to as connection plates 4 and 5. Both surfaces of each inner plate 2 come into contact with the rubber layers 3. The connection plates 4 and 5 are arranged on the top and bottom ends of the composite 1 and are provided with flanges 4a and 5a. Each of the inner plates 2 and the rubber layers 3 has a thickness in a range of several millimeters. The number of inner plates 2 and rubber sheet layers 3 which are overlaid alternately ranges from about half a dozen to several dozens. The connection plates 4 and 5 function as flanges to fix the composite to a foundation or a structure. These connection plates 4 and 5 are therefore thicker and wider than the inner plates 2. The inner plates 2 are provided to increase the rigidity of the composite in the longitudinal direction or overlaying direction. It is therefore preferred that the thickness of each inner plate 2 be almost equal to that of each rubber layer 3.

In FIG. 1, the peripheries of the inner plates 2 are surrounded by a cylindrical rubber layer 3a, and thus each inner plate 2 is completely embedded in the rubber layers 3 and the cylindrical rubber layer 3a. The inner plates 3 can therefore be prevented from corrosion in a vulcanizing step of the unvulcanized composite.

In FIG. 2, the peripheries of the inner plates 2 are exposed since the cylindrical rubber layer is omitted. In FIG. 3, the peripheries 2a of some inner plates 2 are exposed and the other inner plates 2 are surrounded by rubber. When a mold is attached along the exposed peripheries 2a, the inner plates 2 are heated by thermal conduction from the heated mold and the unvulcanized rubber layers 3 can be more effectively vulcanized by thermal conduction from the inner plates 2. When the composite is cooled, forced cooling of the peripheries 2a of the inner plates 2 with a cooling medium can shorten the cooling time.

The metal plates 2, 4 and 5 are made of an electrically conductive material, eddy currents are generated inside the metal plates under a varying magnetic-flux environment, and the metal plates are heated by the eddy currents. The composite 1 is therefore heated through the metal plates 2, 4 and 5 by magnetic induction heating. When the metal plates 2, 4 and 5, which are provided in the path of the magnetic flux, have magnetic characteristics, the magnetic field is enhanced and thus the quantity of heat increases as eddy currents increase. The rubber layers 3 are heated by thermal conduction through the heated metal plates 2, 4 and 5. Since the composite 1 is generally used as an anti-seismic damper below a column of a structure such as a building, it must be durable for a long time, such as several decades, under a high load, e.g. several hundred tons. It is therefore preferred that these metal plates be made of a material having higher corrosion resistance than steel. Examples of anticorrosion materials include stainless steel, aluminum, aluminum alloys, copper and copper alloys. Use of these anticorrosion materials can prevent a decrease in design load of the composite due to corrosion. Another preferred material for the metal plates 2, 4 and 5 from the point of view of its strength and cost of materials is a martensitic stainless steel.

A method for heating the composite will now be described with reference to FIG. 4.

Figure 4:
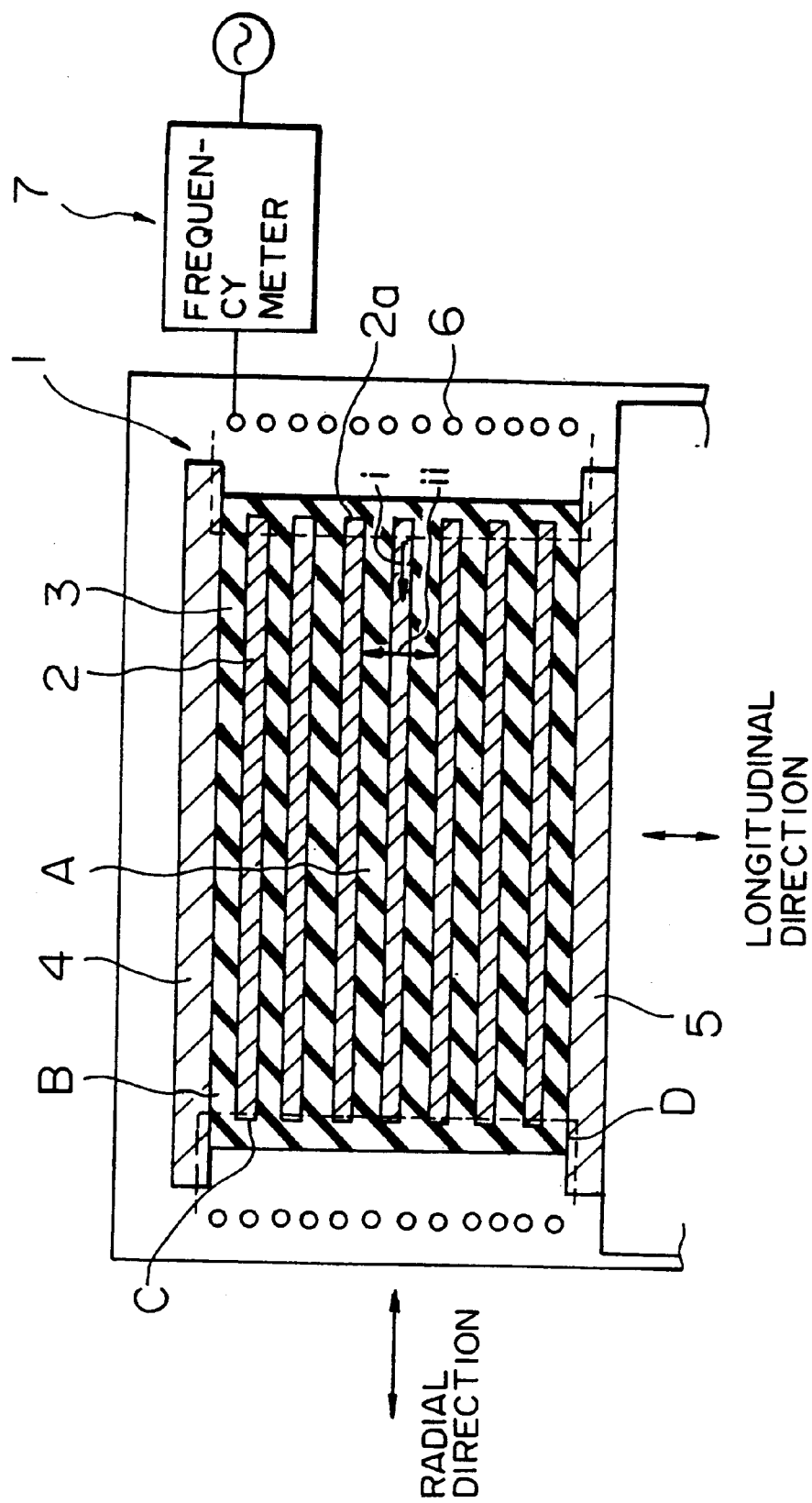
FIG. 4 is a cross-sectional view of an apparatus for carrying out the method in accordance with the present invention.

In FIG. 4, a spiral induction coil 6 is wound onto the periphery of the composite 1 and an alternating current is applied to the induction coil 6 through a frequency meter 7. The frequency meter 7 comprises, for example, an inverter damper and generates an alternating current flow with an appropriate frequency of 1 kHz or less. Preferably, the induction coil 6 is arranged between the upper and lower connection plates 4 and 6 so as to be close to the edge or periphery 2a of the inner plates 2 as much as possible. The magnetic flux generated by the induction coil 6 forms a loop, as shown in broken lines in the drawing, which passes through the lower surface layer of the upper connection plate 4, pierces the inner plates 2 near their peripheries 2a and passes through the upper surface layer of the lower connection plate 5. Eddy currents are generated near the peripheries 2a of the inner plates 2, and the inner plates 2 are heated near their peripheries 2a by means of $I^2R$ loss due to the eddy currents.

The inner plates 2 are made of a highly thermal conductive material, whereas the unvulcanized rubber layers 3 being into contact with the inner plates 2 have heat insulating characteristics. The heat generated near the periphery 2a of each inner plate 2 rapidly dissipates toward the center of the inner plate 2 as shown by arrow i in the drawing, not toward the rubber near the periphery. As a result, the inner plate 2 immediately has a uniform temperature distribution. The heat accumulated in the entire inner plate 2 gradually dissipates toward the unvulcanized rubber layer 3 as shown by arrow ii in the drawing. Since such heat dissipation occurs in all the inner plates 2, the composite 1 as a whole is rapidly and uniformly heated from its interior.

The heating method by magnetic induction in accordance with the present invention will now be compared with a conventional steam heating method with reference to the graphs illustrating the results of the simulation.

Figure 5:
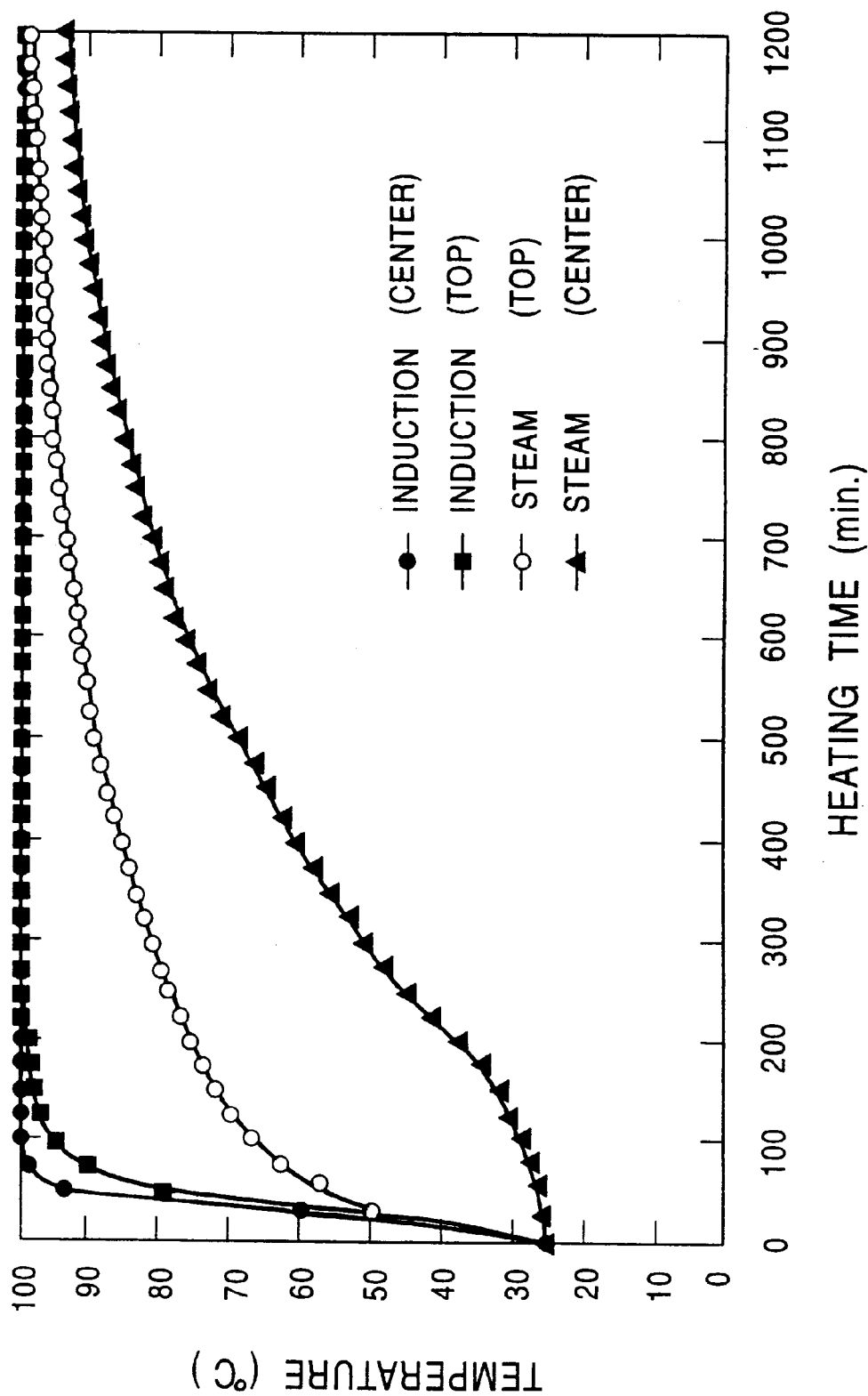
FIG. 5 is a graph of heating performance using different heating sources.

In FIG. 5, a composite 1 is heated by induction heating to 100° C. by applying a 60 Hz alternating current or by external steam heating in a steam room. In the legend of the drawing, the word "center" represents position A in the rubber layer of the composite 1 shown in FIG. 4 and is just the center in the longitudinal and transverse (or radial) directions of the composite 1. The word "top" represents position B in the rubber layer of the composite shown in FIG. 4 and is located near the periphery 2a of the metal plate 2 and at the top rubber layer.

In FIG. 5, both the center (●) and the top (■) are rapidly heated in a short time by induction heating, whereas the top (♦) and the center (▲) are gradually heated by steam heating. The temperature difference between the center and the top is relatively small in the induction heating as shown by similar heat-up curves in the drawing, whereas a large difference between the center and the top in the heat-up curves of the steam heating demonstrates nonuniform heating of the composite.

In the magnetic induction heating, since the composite is heated from its interior, it is uniformly heated in a short time and both the center A and the top B reach a saturated temperature of 100° C. after approximately 100 minutes. In contrast, in the steam heating the composite is heated from the exterior toward the interior, a significant temperature difference between the center A and the top B is observed for a long time, and both the center A and the top B reach saturated temperatures of near 100° C. after approximately 20 hours. Accordingly, the results of the simulation suggest that the induction heating in accordance with this embodiment of the composite 1 shortens the vulcanizing time to one-tenth of that in the steam heating.

A martensitic stainless steel used as metal plates 2, 4 and 5 will now be compared with a steel sheet.

Figure 6:
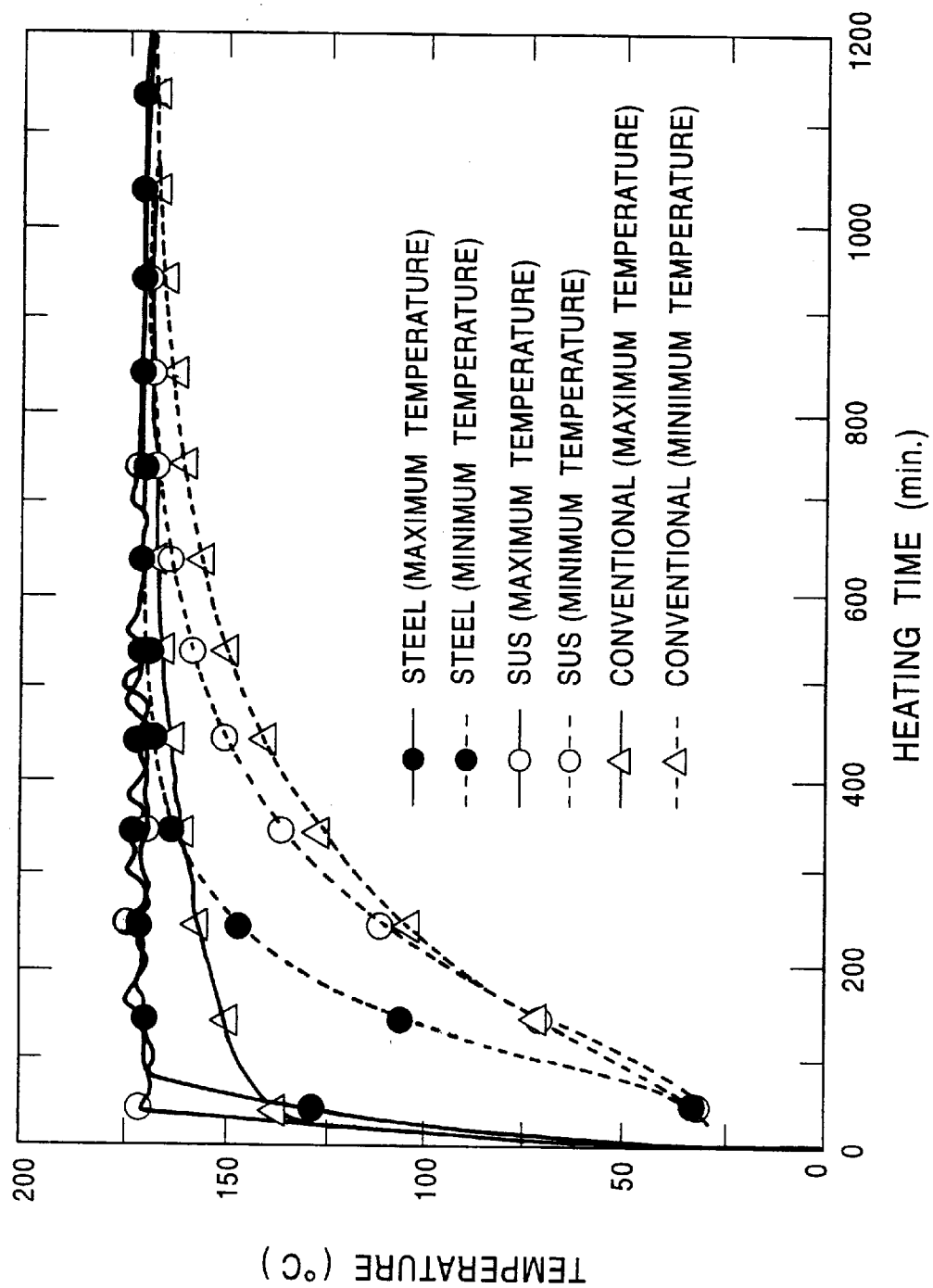
FIG. 6 is a graph for comparing heat-up curves according to a method of the present invention with heat-up curves according to a conventional method.

FIG. 6 is a graph illustrating the results (○) of the simulation in which a martensitic stainless steel (SUS) sheet having high corrosion resistance is used as the inner plates 2 and the connection plates 4 and 5 of the composite 1 and heated to 150° C. by applying a 60 Hz alternating current. FIG. 6 also shows the results of a steel sheet (●) having low corrosion resistance and a metal sheet (Δ) heated by a conventional steam heating process at 170° C.

The graph demonstrates that the time required for the plate to reach 150° C. from the start is 440 minutes for the induction heating of the stainless steel (SUS) composite, 220 minutes for the induction heating of the steel composite and 520 minutes for the steam heating. Comparing the maximum and minimum temperatures, the induction heating of the steel composite has the smallest temperature difference therebetween, the steam heating of the metal sheet has the largest temperature difference, and the induction heating of the stainless steel composite has an intermediate temperature difference. Although the stainless steel composite needs a longer induction heating time than the steel composite due to lower electrical conductivity, the stainless steel composite can be more rapidly heated by the internal induction heating than the external steam heating.

Although the results shown in FIGS. 5 and 6 suggest that induction heating is superior to steam heating, a slight temperature difference is observed between the center A and the top B in the composite 1. More specifically, FIG. 5 demonstrates that the heat-up curve in the center A (●) is steeper than that in the top B (■) and thus the center A is heated slightly more rapidly than the top B in the composite 1. These results suggest that heat dissipation from the peripheries 2a of the inner plates 2 toward the center is superior to that from the top and bottom ends of the composite 1, and the dissipated heat is accumulated in the center.

It is therefore preferred that the frequency of the induction coil 6 be varied to control heat formation such that both the top and the bottom have the same heat-up curves.

On the other hand, an excessively increased frequency of the alternating current flow by the frequency meter tends to heat intensively the peripheries C and D (refer to FIG. 4) of the highest and lowest inner plates among the inner plates 2 and thus causes temperature gradients in the longitudinal and radial directions of the composite 1. The frequency therefore must be 1 kHz or less in order to heat the peripheries 2a of all the inner plates 2.

Even at a frequency of 1 kHz or less, temperature gradients in the radial direction may form in the metal plates. In this case, application of a lower frequency increases the depth of penetration of the magnetic flux in the radial direction from the edge of each metal plate. The joule heat distribution in the radial direction of the metal plates therefore broadens to level the temperature difference as the frequency decreases.

Figure 7:
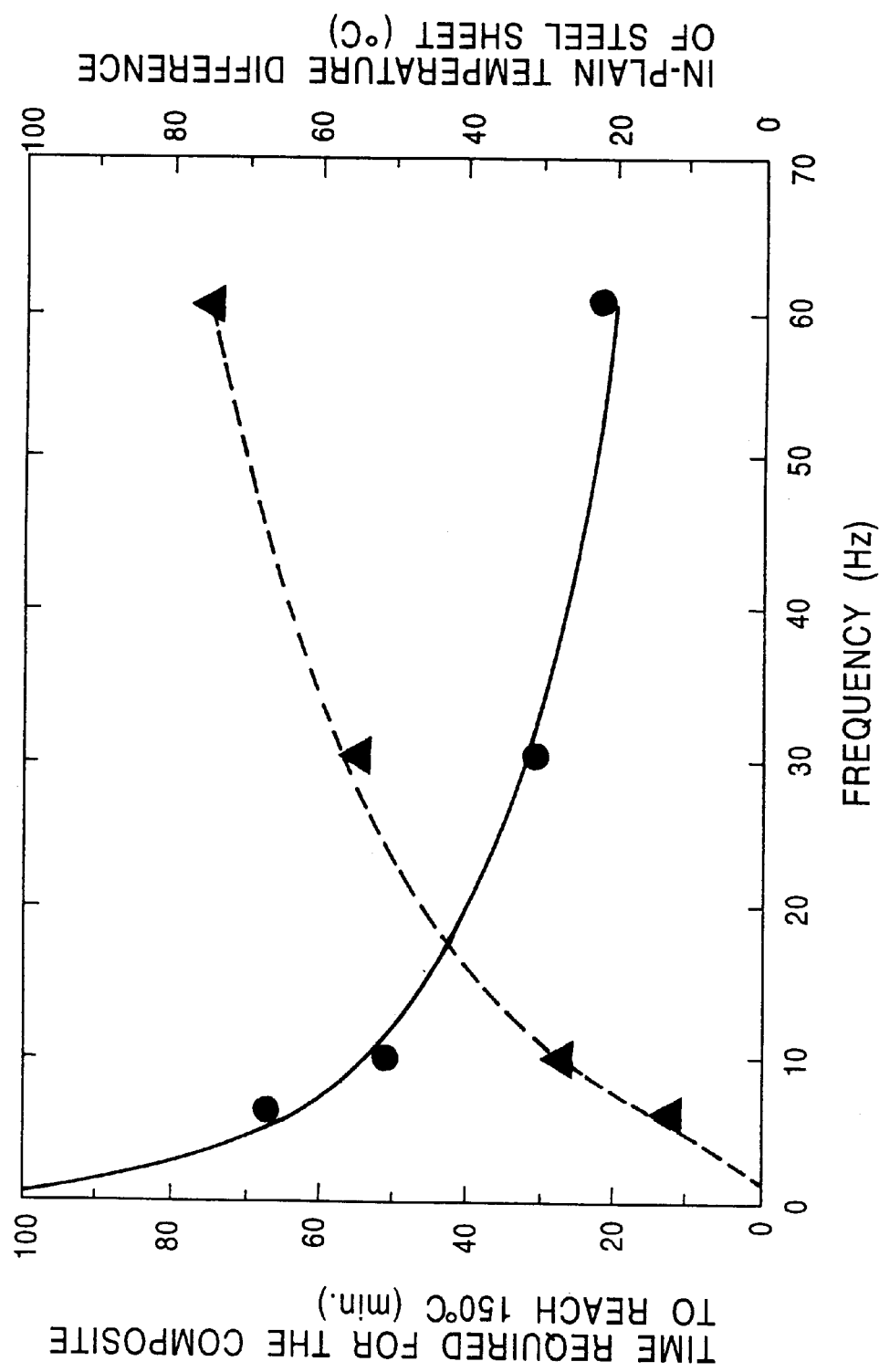
FIG. 7 is a graph illustrating correlations between the frequency and the heating time and between the frequency and the in-plain temperature difference of a steel plate.

FIG. 7 is a graph illustrating the correlations between the frequency of the coil and the heating time and between the frequency and the temperature difference, in which an alternating magnetic field is applied to a composite with a diameter of 500 mm made by overlaying 25 steel sheets with a thickness of 3 mm and 26 vulcanized rubber sheet with a thickness of 5 mm alternately.

FIG. 7 demonstrates that the in-plain temperature difference (▲) of the inner plate 2 decreases as the frequency decreases, in other words, the composite 1 can be more uniformly heated by a lower frequency. On the other hand, the time (●) required for the entire composite 1 to reach 150° C. increases as the frequency decreases. An optimized frequency range can therefore be determined using FIG. 7 so that the in-plain temperature difference does not affect the vulcanization of the rubber and the temperature of the composite rapidly increases. Accordingly, it is preferable that the frequency be in a range from 1 kHz to 20 kHz. In such a frequency range, the in-plain temperature difference can be controlled to within 50 to 70° C., and the time required to reach 150° C. in a range from 10 to 100 minutes. As described above, the temperature difference in the radial direction of the composite can also be reduced by decreasing the frequency of the alternating magnetic field.

Another method for reducing the in-plain temperature difference is to control the temperature of the mold which comes into contact with the periphery of the composite. In this method, it is preferred that the mold be made of an electrically conductive material and be heated by magnetic induction together with the inner plates. In accordance with this method, since the composite is also heated through the periphery due to heat conduction from the mold, the temperature differences between the core and the periphery of the composite can be reduced more effectively.

Figure 8:
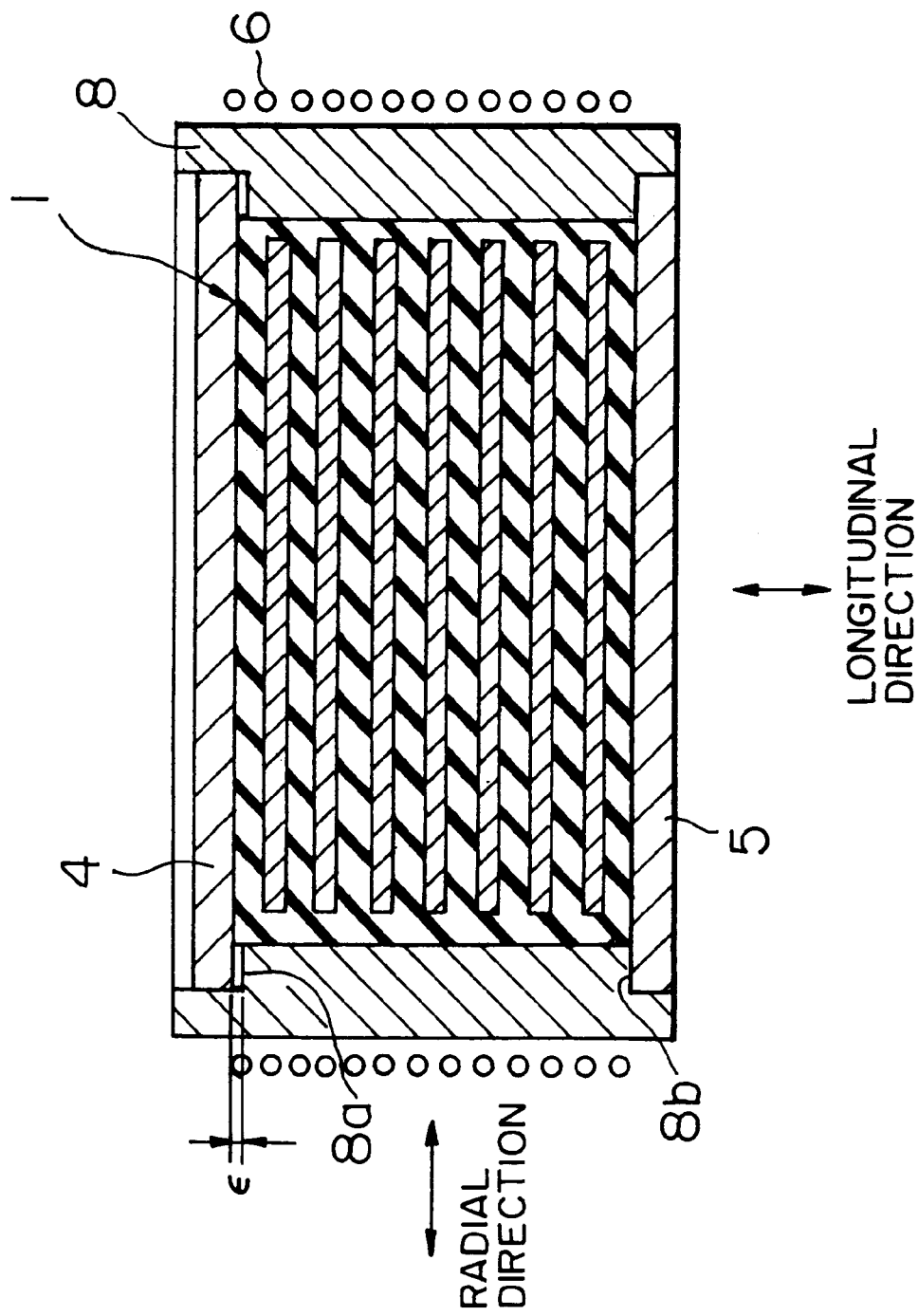
FIG. 8 is a longitudinal cross-sectional view illustrating a method for heating a rubber-metal plate composite in a mold in accordance with the present invention.

A mold 8 shown in FIG. 8 has a cavity having an inner diameter which is substantially equal to the outer diameter of the composite 1 and bounds the composite 1 along the radial direction. The distance between steps 8a and 8b of the mold 8 is shorter by a clearance ε for compression than the distance between the inside faces of the connection plates 4 and 5 of the composite 1. When the composite 1 is heated in the mold 8, the induction coil 6 is provided around the outer periphery of the mold 8.

Figure 9:
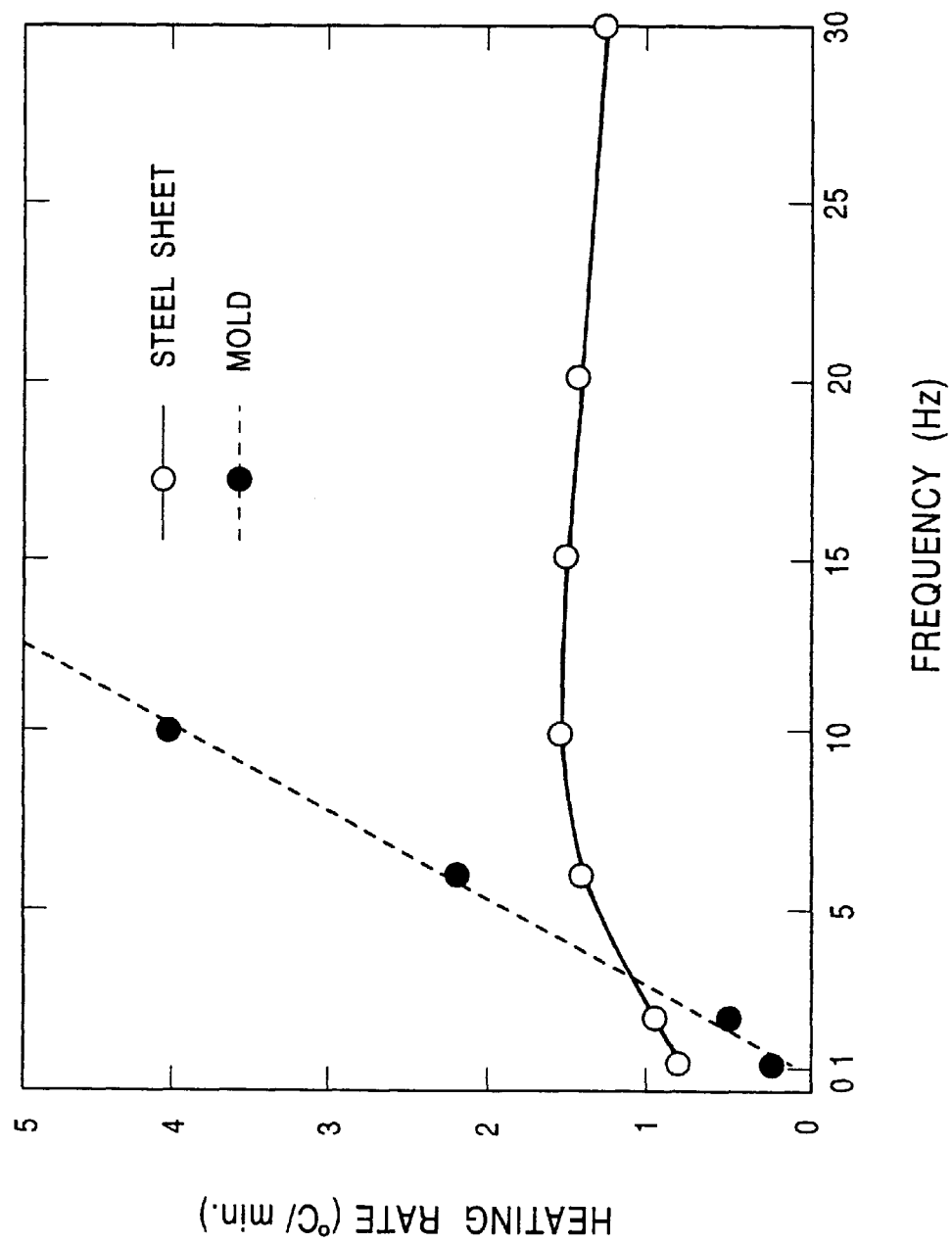
FIG. 9 is a graph illustrating correlations between the frequency and the heating rate of a stainless steel mold and the stainless steel itself.

FIG. 9 is a graph showing the results of the simulation of the correlations between the heating rate and the frequency of an austenitic stainless steel mold (●), as shown in FIG. 8, having a diameter of 25 mm and the stainless steel sheet itself (○). The heating rate of the mold significantly increases with the frequency, whereas the heating rate of the stainless steel sheet does not change substantially. The two heating rates agree at a frequency of approximately 3 Hz. Consequently, in the austenitic stainless steel mold, a frequency of the induction heating of approximately 3 Hz does not cause temperature differences between the core and the periphery of the mold. Further, the heating rates of the mold and the inner plates can be independently controlled by varying the frequency during the heating step in view of the correlations shown in FIG. 9.

It is preferred that the mold 8 be made of a nonmagnetic or weakly magnetic material, because the magnetic flux from the induction coil 6 permeates the mold 8 and reaches the inner plates 2 without attenuation. The magnetic field in the composite 1 therefore is not affected by the mold. A typical example of the nonmagnetic or weakly magnetic material is the above-mentioned austenitic stainless steel. Concrete and ceramics also have the same effect.

As described above, the heating of the mold being in contact with the composite can decrease the temperature differences. When heating or preheating the composite not using a mold, an austenitic stainless steel member may be in contact with the periphery of the composite. Auxiliary use of another heating method at a position having a low heating rate can also offset the temperature differences.

Figure 10:
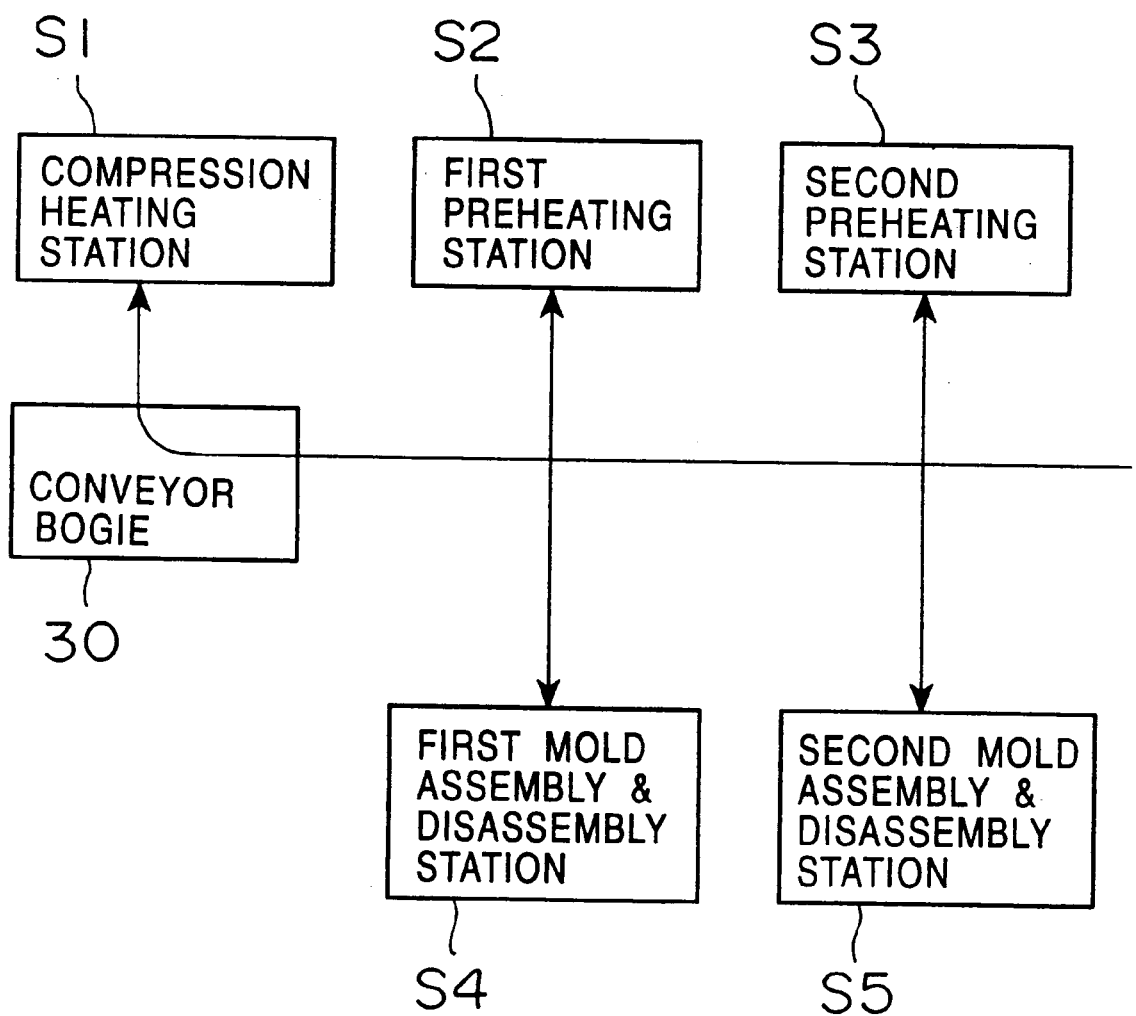
FIG. 10 is a block diagram of a vulcanizing system using a method for heating in accordance with the present invention in a preheating step.

FIG. 10 is a block diagram illustrating an embodiment of a vulcanizing system of the unvulcanized rubber-metal plate composite. In this vulcanizing system, the magnetic induction heating in accordance with the present invention is used in preheating steps (first and second preheating stations S2 and S3), and a conventional steam heating is used in the vulcanizing step (compression heating station S1). The vulcanizing system further includes first and second mold assembly & disassembly stations S4 and S5 (or an assembly station S4 and a disassembly station S5), and a conveyor bogie 30 which carries the mold and the composite between these stations S1 to S5.

Although the composite can be heated without a mold in general, the vulcanizing step with compression requires heating in a compression mold. It is therefore preferred that the composite be vulcanized in the mold on an assembly line from the preheating step to the vulcanizing step. The composite, in FIG. 10, is transferred to the mold assembly station S4 to assemble the mold, preheated at the preheating station S2 or S3, vulcanized at the compression heating station S1 and transferred to the mold disassembly station S5 to detach the mold.

In general, the preheating step for heating the composite to a given temperature requires a longer time than the vulcanizing step for compressing the composite while maintaining the given temperature. The assembly and disassembly of the mold also requires an additional amount of time. The number of the preheating stations is therefore set to be greater than the number of the vulcanizing stations in order to shorten the vulcanizing cycle and improve the productivity of the composite. Similarly, it is preferred that a plurality of mold assembly & disassembly stations be provided. The vulcanizing system in FIG. 10 has two preheating stations and one compression heating station. The ratios between these numbers are determined in view of time periods required for these steps.

Figure 11:
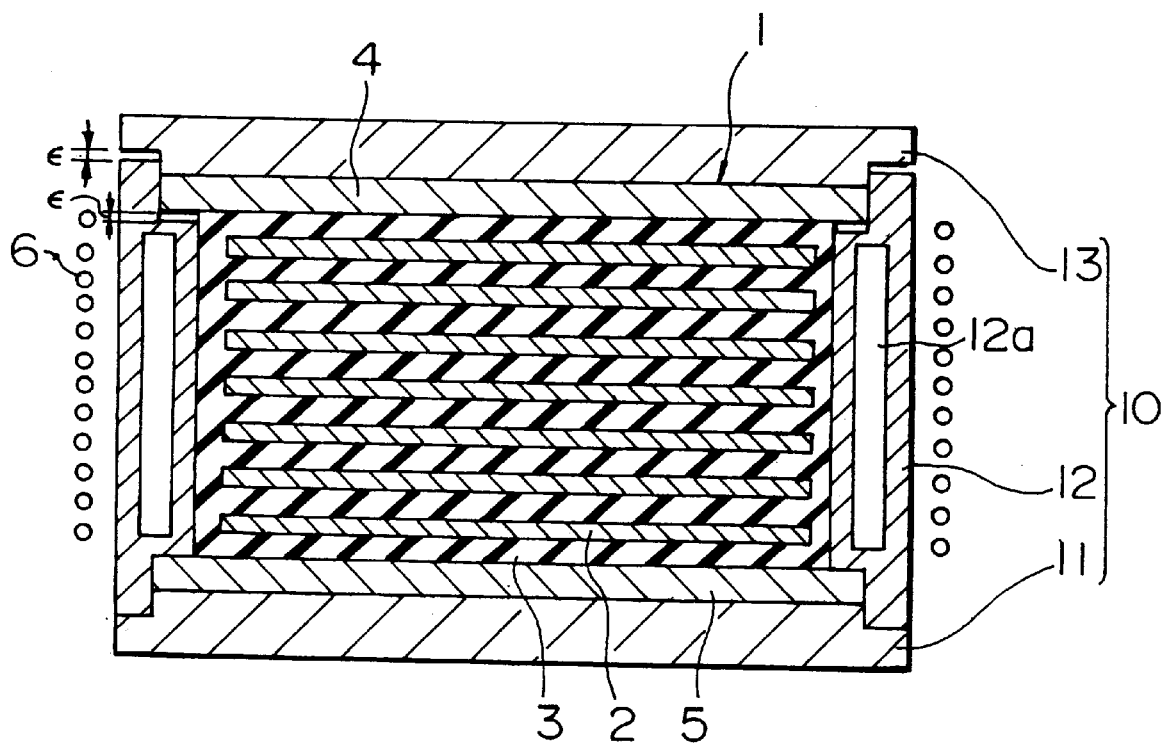
FIG. 11 is a longitudinal cross-sectional view of an apparatus for preheating a rubber-metal plate composite in a mold by magnetic induction.
Figure 12:
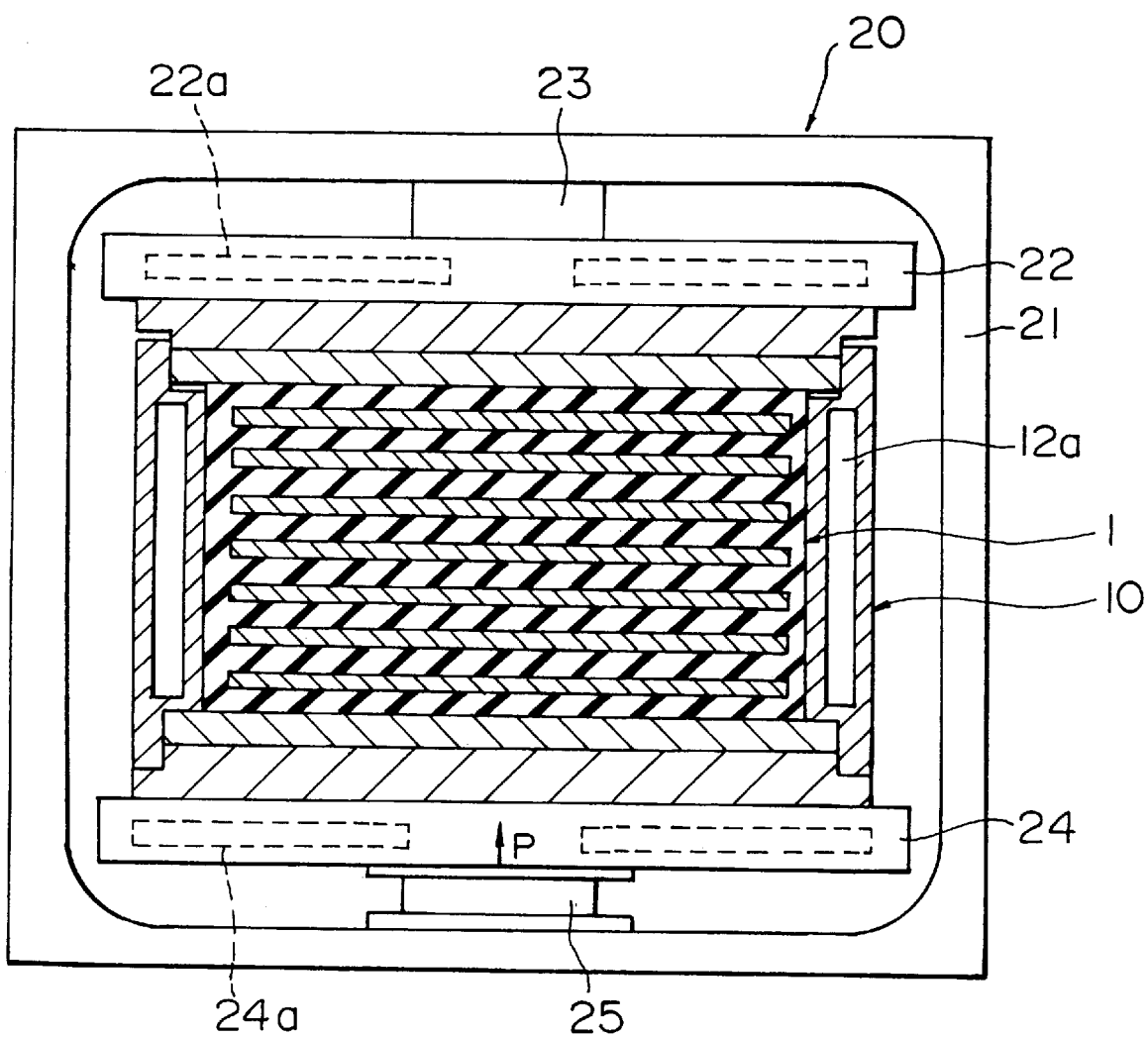
FIG. 12 is a longitudinal cross-sectional view of an embodiment of a vulcanizing apparatus used after a composite is preheated by magnetic induction.

Apparatuses shown in FIGS. 11 and 12 are used in the system shown in FIG. 10. Specifically, the preheating step is performed by magnetic induction using the apparatus shown in FIG. 11 and the vulcanizing step is performed by steam heating using the apparatus shown in FIG. 12.

In FIG. 11, a mold 10 includes a cylindrical mold main body 12 bounding the periphery of the composite 1, and a lower cover 11 and an upper cover 13 which come into contact with the bottom and top ends of the composite, respectively. The lower connection plate 5 of the composite is supported by the lower cover 11 and the mold main body 12 and the upper connection plate 4 is supported by the upper cover 13 and the mold main body 12. A clearance ε for compression is provided between the upper cover 13 and the mold main body 12. The induction coil 6 is provided on the outer periphery of the mold main body 12 within a range between the connection plates 4 and 5. A heating jacket 12a used in the vulcanizing step is provided inside the mold main body 12. Use of a vertically dividable mold main body 12 helps loading and unloading of the composite 1 into the mold. Dividable upper and lower covers are also useful. The upper cover 13 and/or the lower cover 11 may be omitted.

The mold main body 12 is made of, preferably, a nonmagnetic or weakly magnetic material, such as SUS304, as described above so that the magnetic flux from the induction coil 6 permeates the mold 10 and reaches the inner plates 2. When a low frequency alternating current is applied to the induction coil 6, the entire composite 1 is rapidly heated from its interior as the preheating step. Since SUS304 is an electrically conductive material and thus is heated by magnetic induction, the composite 1 is also heated through the periphery being in contact with the mold main body 12 so as not to form temperature differences between the core and the periphery.

In FIG. 12, a vulcanizing press 20 comprises a press frame 21, an upper platen 22 provided under the top face of the press frame 21 through a height adjusting mechanism 23, and a lower platen 24 provided on the bottom face of the press frame 21 through a pressure cylinder 25. After shrinking the pressure cylinder 25, the mold 10 containing the preheated composite 1 is loaded on a given position in the vulcanizing press 20 by, for example, sliding the mold 10 in the transverse direction. Next, the pressure cylinder 25 is expanded to compress the composite 1 in the mold 10 through the upper and lower platens 22 and 24, and steam is simultaneously introduced into the heating jacket 12a in the main body 12 to heat and vulcanize the composite 1. Heating jackets 22a and 24a to introduce steam may be provided inside the upper and lower platens 22 and 24.

Figure 13:
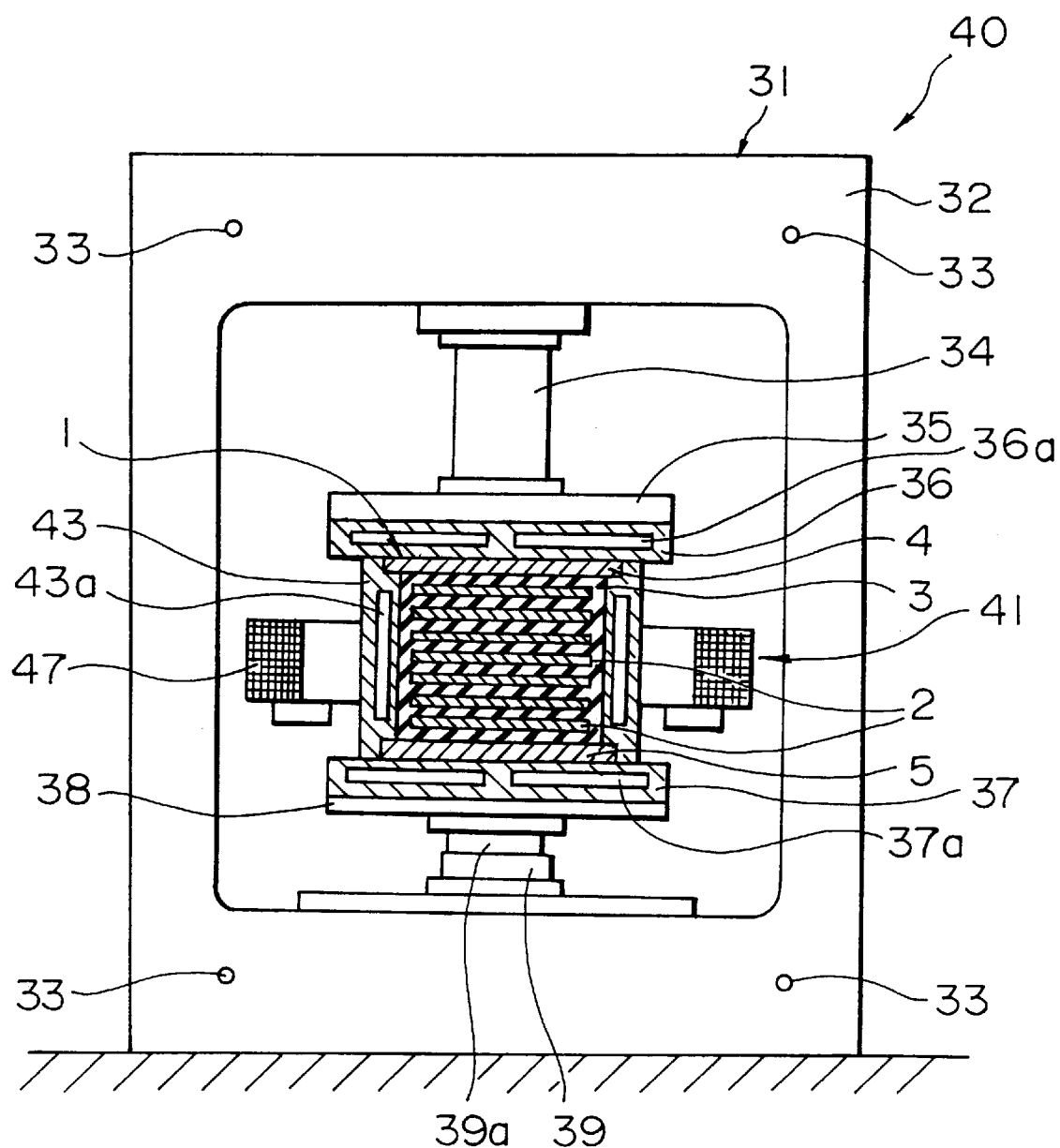
FIG. 13 is a longitudinal cross-sectional view of an apparatus preheating and vulcanizing a composite.

The magnetic induction heating in accordance with the present invention may be used in the vulcanizing step. In this case, it is preferred that the preheating and vulcanizing steps be performed in the same apparatus as shown in FIG. 13. Alternatively, a combination of the preheating step by a conventional heating process such as steam heating and the vulcanizing step by the magnetic induction heating may be also usable.

A heating apparatus which performs preheating and vulcanization will now be described in detail with reference to FIG. 13.

The heating apparatus includes a press 40 vertically pressing the composite 1 loaded into the mold 43 and a magnetic induction heating unit 41 heating the composite 1. The press 40 is provided with a hollow frame 31. The hollow frame 31 is formed by stacking a plurality of plate frame pieces 32 and fixing them to each other with bolts 33. The number of plate frame pieces 32 varies with the applied stress and the formed strain.

A spacer 34 hangs from the upper side of the frame 31, and is provided with an upper platen 36 with an inner cavity 36a through a platen supporter 35 on the bottom end of the spacer 34. A lower platen 37 with an inner cavity 37a is arranged below the upper platen 36. The inner cavities 36a and 37a are connected to a heat source not shown in the drawing. The upper and lower platens 36 and 37 are heated to a given temperature or higher by a heating medium, such as steam, supplied to the inner cavities 36a and 37a through the heat source.

The lower platen 37 is supported on a hydraulic pressure cylinder 39 through a platen supporter 38. The hydraulic pressure cylinder 39 is provided with a pressure rod 39a having a vertical axis, and the lower platen 37 lifts or lowers in response to the movement of the pressure rod 39a. The mold 43 containing the composite 1 is placed between the upper and lower platens 36 and 37. The mold 43 has a hollow cylindrical shape so as to come into contact with the composite 1 and has a cavity 43a which is connected to a heat source not shown in the drawing during the vulcanizing step. The mold 43 is heated to a given temperature or higher by a heating medium, e.g. steam, supplied to the cavity 43a through the heat source. The mold 43 is made of a nonmagnetic material, such as SUS304, to satisfactorily form a magnetic field in the mold.

The composite 1 loaded into the mold 43 has a cylindrical unvulcanized rubber 3. A plurality of metallic inner plates 2 are arranged at a given interval in the unvulcanized rubber 3. Metallic connection plates 4 and 5 are joined to the top and bottom ends of the unvulcanized rubber 3. These connection plates 4 and 5 and inner plates 2 heat the unvulcanized rubber 3 from both ends and the interior by magnetic induction heating.

The connection plates 4 and 5 and the inner plates 2 are heated by a magnetic induction heating apparatus 41 arranged on the periphery of the mold as shown in FIG. 13. The magnetic induction heating apparatus 41 is provided with a circular induction coil 47 and a cooling unit which forcibly cools the induction coil 47 with air or water. The induction coil 47 is connected to a frequency meter 7 (power unit) shown in FIG. 4 and the frequency meter 7 generates a magnetic field having a given intensity around the induction coil 47 while varying the frequency of the alternating current flow applied to the induction coil 47.

The operation of the heating apparatus will be described.

The mold 43 and the induction coil 47 are loaded into the press 40, and the pressure rod 39*a* is extended from the pressure cylinder 39 to compress the composite 1 in the mold 43 through the upper and lower platens 36 and 37. A heating medium, e.g. steam, is supplied to the lower and upper platens 36 and 37 and the mold 43 to heat them, while an alternating current having a given frequency is applied to the induction coil 47 to generate a magnetic field around the induction coil 47.

The magnetic field permeates the upper and lower connection plates 4 and 5 being in contact with the unvulcanized rubber and the inner plates 2 embedded into the unvulcanized rubber 3 and generates eddy currents in these plates. The unvulcanized rubber 3 is heated at the inside and the periphery by the heat due to eddy currents from the connection plates 4 and 5 and the inner plates 2. The unvulcanized rubber 3 is vulcanized by the continuation of such heating. After the vulcanization of the composite 1 is completed, the mold 43 containing the vulcanized composite 1 is transferred from the press 40 to the subsequent step, such as a cooling step.

Any other heating means, e.g. electric heating, may be used for heating the upper and lower platens 36 and 37 and the mold 43 instead of heating by a heating medium such as steam. When a temperature difference occurs during the induction heating, it is preferable that the region having a lower temperature be additionally heated by these heating means in view of rapid and uniform heating.

In the above embodiment, the induction coil is spirally wound along the periphery of the composite 1. Alternatively, a plurality of bellow induction coils may be provided on the outer periphery of the composite 1, or the composite may be arranged so as to be affected by the magnetic flux from a U-shaped iron core with a wound coil. Consequently, it is important that the magnetic flux permeates the inner plates in the composite 1 and more specifically that it heats the radial edges of the inner plates.

Figure 14:
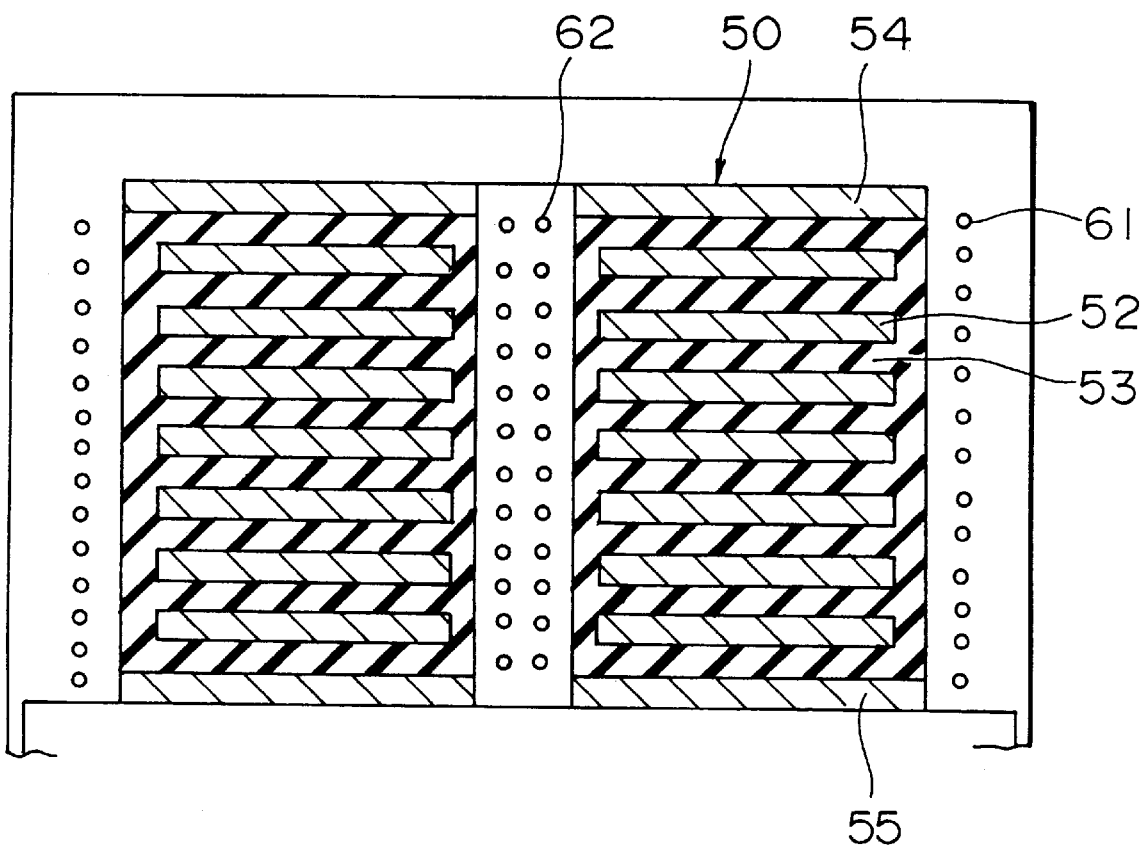
FIG. 14 is a longitudinal cross-sectional view of an apparatus heating a hollow cylindrical composite by magnetic induction.

The composite 1 may have a cavity. A method for heating a hollow cylindrical composite 50 will be described with reference to FIGS. 14 and 15. The hollow composite 50 shown in FIG. 14 made by embedding inner plates 52, having center holes, into unvulcanized rubber 53 and adhering the connection plates 54 and 55, having the same diameter as that of the unvulcanized rubber 53, onto the upper and bottom end of the unvulcanized rubber 53. In such a composite configuration, induction coils 61 and 62 are arranged on the inner and outer peripheries of the composite 51 to heat the composite from the two peripheries.

Figure 15:
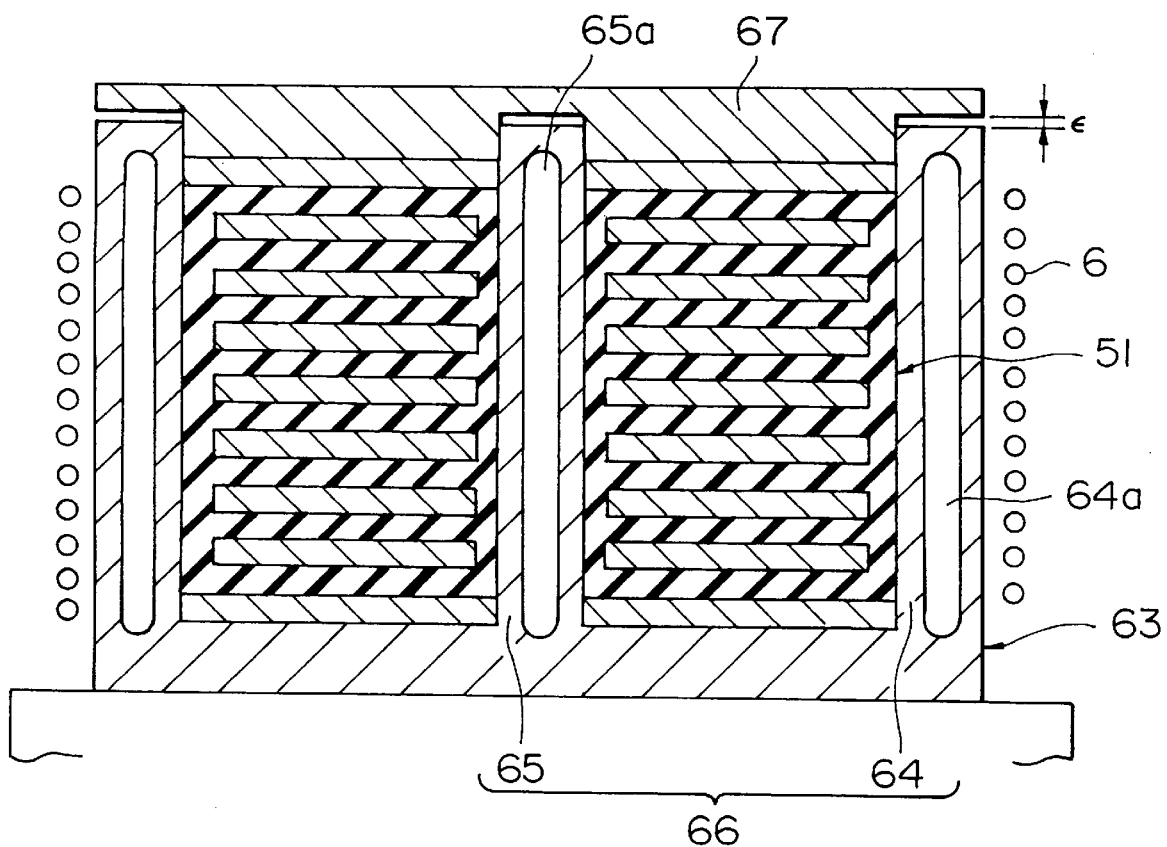
FIG. 15 is a longitudinal cross-sectional view of an apparatus heating a hollow cylindrical composite in a mold by magnetic induction.

In FIG. 15, the composite 51 is loaded into a mold 63 to be heated by magnetic induction through the mold. The mold 63 comprises a lower mold section 66 having a vertical outer cylinder 64 and a vertical central column 65 and an upper mold section 67 which covers the lower mold 66 so as to form a clearance ε for compression. The mold 63 is made of a nonmagnetic material, such as SUS304, and heats the composite 51 by an induction coil 6 arranged on the outer periphery of the outer cylinder 64 of the lower mold section 66. The outer cylinder 64 and the central column 65 have heating jackets 64*a* and 65*a*, respectively therein to additionally heat the composite 1 by, for example, steam heating.

The composite 1, in which the inner plates 2 are exposed as shown in FIGS. 2 and 4, can be cooled from the inside by heat conduction through the inner plates 2 which are forcibly cooled at their exposed edges in a cooling step after the vulcanization. The cooling time can therefore be reduced.

Figure 16:
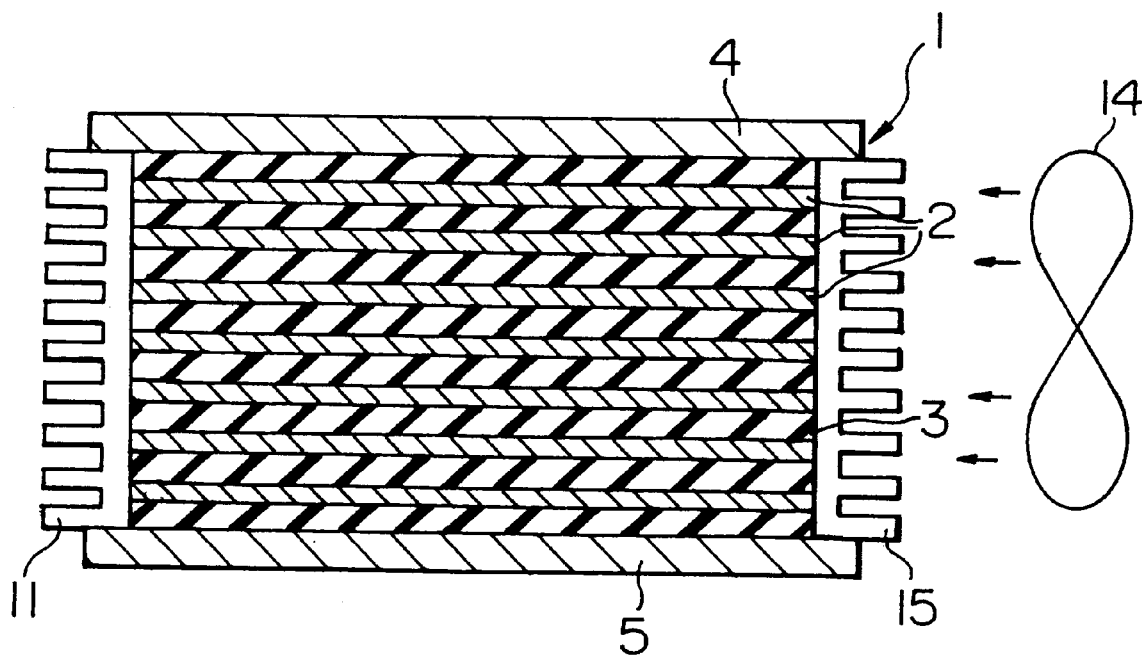
FIG. 16 is a longitudinal cross-sectional view illustrating an embodiment of a cooling step in accordance with the present invention.

The composite may be cooled by spontaneous heat dissipation or by forced cooling as shown in FIG. 16 in which a fan 14 blows air as a coolant onto the exposed edges of the inner plates 2. Gaseous nitrogen may be used instead of the air, or a liquid coolant, such as water or oil, may be used instead of the gaseous coolant. Alternatively, cooling fins 15 may be provided on the exposed sections to promote the spontaneous heat dissipation. A combination of the cooling fins 15 and a gaseous or liquid coolant will further accelerate the cooling of the composite 1. When using air or water as a coolant, it is preferred that the inner plates 2 be made of a stainless steel sheet in order to prevent corrosion of the inner plates 2 due to the coolant.

What is claimed is:

1. An apparatus for heating a rubber-metal plate composite comprising a plurality of unvulcanized rubber layers and metal plates, each being overlaid alternately, by induction heating, said apparatus comprising:

an induction coil for applying a magnetic field to said composite and heating said metal plates due to eddy currents generated by the magnetic field;

a power unit for applying an alternating current to said induction coil to generate said magnetic field;

a mold to confine the periphery of said composite; and a heating unit for heating said mold.

2. An apparatus for heating a rubber-metal plate composite comprising a plurality of unvulcanized rubber layers and metal plates, each being overlaid alternately, by induction heating, said apparatus comprising:

an induction coil for applying a magnetic field to said composite and heating said metal plates due to eddy currents generated by the magnetic field;

a power unit for applying an alternating current to said induction coil to generate said magnetic field; and hot plates for heating both the top and bottom ends of said composite.

3. An apparatus for heating a rubber-metal plate composite comprising a plurality of unvulcanized rubber layers and metal plates, each being overlaid alternately, by induction heating, said apparatus comprising:

an induction coil for applying a magnetic field to said composite and heating said metal plates due to eddy currents generated by the magnetic field; and a power unit for applying an alternating current to said induction coil to generate said magnetic field; and a frequency meter for changing and controlling the frequency of said alternating current.

4. An apparatus for manufacturing a vulcanized rubber-metal plate composite comprising an apparatus for heating described in claim 1 and a compressing means for compressing said composite in the longitudinal direction.

* * * * *